(12) United States Patent
Osterweil et al.

(10) Patent No.: US 8,572,680 B2
(45) Date of Patent: *Oct. 29, 2013

(54) WHITE LISTING DNS TOP-TALKERS

(71) Applicants: Eric Osterweil, McLean, VA (US); Danny McPherson, Leesburg, VA (US)

(72) Inventors: Eric Osterweil, McLean, VA (US); Danny McPherson, Leesburg, VA (US)

(73) Assignee: Verisign, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/829,634

(22) Filed: Mar. 14, 2013

(65) Prior Publication Data

US 2013/0198803 A1 Aug. 1, 2013

Related U.S. Application Data

(63) Continuation-in-part of application No. 13/572,185, filed on Aug. 10, 2012.

(60) Provisional application No. 61/522,493, filed on Aug. 11, 2011.

(51) Int. Cl.
*G06F 17/00* (2006.01)
*G06F 7/04* (2006.01)

(52) U.S. Cl.
USPC ............. 726/1; 726/4; 726/6; 726/26; 726/27

(58) Field of Classification Search
USPC ......................................... 726/1, 4, 6, 26, 27
See application file for complete search history.

(56) References Cited

U.S. PATENT DOCUMENTS

| | | | |
|---|---|---|---|
| 7,620,733 B1 | 11/2009 | Tzakikario et al. |
| 2003/0110274 A1 | 6/2003 | Pazi et al. |
| 2005/0044352 A1 | 2/2005 | Pazi et al. |
| 2008/0104182 A1 | 5/2008 | Jimmei |
| 2009/0319659 A1 | 12/2009 | Terasaki et al. |

FOREIGN PATENT DOCUMENTS

EP 2222048 A1 8/2010

OTHER PUBLICATIONS

Eric Osterweil et al., "White Listing DNS Top-Talkers", U.S. Appl. No. 13/572,185, filed Aug. 10, 2012.
Antoine Schonewille et al., "The Domain Name Service as an IDS, How DNS can be used for detecting and monitoring badware in a network", Feb. 5, 2006, pp. 1-24, http://www.delaat.net/rp/2005-2006/p12/report.pdf, accessed Dec. 4, 2012.

*Primary Examiner* — Mohammad W Reza
(74) *Attorney, Agent, or Firm* — MH2 Technology Law Group, LLP

(57) ABSTRACT

Systems and methods for creating a list of trustworthy resolvers in a domain name system. A computer receives a resolver profile for a resolver sending queries to a domain name server. The resolver profile is based on any, or a combination, of a top-talker status of the resolver, a normalcy of distribution of domain names queried, a continuity of distribution of query type, and a RD bit status, and information related to query traffic based on the topology of the domain name server. Resolver profiles can be compared to a trust policy to determine whether the resolver is trustworthy. Resolvers deemed trustworthy can be added to a list of trustworthy resolvers. Embodiments can detect the occurrence of a network-based attack. Embodiments can mitigate the effect of a network-based attack by responding only to queries from resolvers on the list of trustworthy resolvers.

28 Claims, 9 Drawing Sheets

WHITE LISTING DNS TOP-TALKERS

RELATED APPLICATION

This application is a continuation-in-part to U.S. patent application Ser. No. 13/572,185 filed on Aug. 10, 2012 titled "White Listing DNS Top-Talkers," which claims the benefit of priority of U.S. Provisional Application No. 61/522,493, filed Aug. 11, 2011, both of which are incorporated herein by reference.

TECHNICAL FIELD

This disclosure is generally directed to systems and methods for detecting and responding to Distributed Denial-of-Service (DDoS) attacks, and particularly DDoS attacks that target a top-level domain name server or employ a top-level domain name server in an attack against third-party servers.

BACKGROUND

The Domain Name System (DNS) is a naming system for devices and resources connected to the Internet or other networks. The DNS improves the user friendliness of network navigation by employing "resolvers" and domain name servers to translate easy-to-remember domain names to numerical IP addresses. For example, the DNS translates a website such as www.verisgn.com to a wide range of data including IPv4 addresses, IPv6 addresses, email services, and more.

Domain names form a tree-like hierarchical name space. Each node in the tree, except the leaf nodes, is called a domain. At the top of the tree, the root domain delegates authority to Top Level Domains (TLDs) like .com, .net, .org, and .edu. The TLDs then delegate authority to create Second-Level Domains (SLDs), such as the colostate.edu domain, the verisign.com domain; and so forth. The repository of information that makes up the domain database is divided up into logical name spaces called zones. Each zone belongs to a single administrative authority and is served by a set of authoritative name servers. The multiple servers for each zone provide redundancy and fault tolerance.

TLDs such as .com and .net play a crucial role in the DNS. Popular TLDs are arguably more important than the DNS root because of the DNS's name space fan-out. For example, after a resolver learns the .com referral from the root, that referral is cached, and the resolver can send all subsequent queries for .com addresses to the .com TLD name server. The resolver will not have to query the root again until the cached information expires. However, every unique SLD, such as verisign.com, must be sent to the .com TLD name server when first looked up. There are over 100 million zones under .com and .net, and only a portion of these zones is cached at any given time. A collapse of all .com or .net TLD name servers would thus render unreachable any zones that are not cached.

TLD attacks are relatively easy to perpetrate due to the nature of DNS communications. That is, DNS communications are typically sent via the User Datagram Protocol (UDP). UDP is a simple communication protocol for transmitting small data packets without a connection handshake, acknowledgment, ordering, or error correction. The low processing overhead of UDP makes it useful for streaming media applications such as video and Voice over IP, and for answering small queries from many sources, such as in DNS resolution. Unfortunately, these same properties allow attackers to use DNS resolution for nefarious purposes, Because UDP is connectionless, an attacker can "spoof" the source address (that is, forge a false source IP address in the IP packet such that the DNS server sends the query response to a third party) without having to worry about completing a connection handshake, resulting in the DNS server sending responses to a machine that never sent a query. Moreover, the query message can be relatively small (under 512 bytes) while the resulting response can be substantially larger due to large numbers of resource records in the response. This allows an attacker to leverage a DNS server to magnify an attack. DNS queries and response may also be sent over stateful Transmission Control Protocol (TCP), which exhibits similar vulnerabilities that can also be managed using embodiments of the invention disclosed herein.

Some attacks target the TLD itself. For example, an "outage" attack floods a TLD with queries in an attempt to either knock the TLD offline or overwhelm to the extent that it cannot respond to legitimate queries.

Other attacks use TLDs to multiply attack traffic aimed at third-party servers. In a "reflector" attack, for example, an attacker issues multiple DNS queries using a forged source address(es), causing the TLD to direct all responses toward the innocent victim, swamping the victim's host servers.

A third type of attack occurs when many queries all request the same SLD. The attacker may be trying to prod the TLD into defending itself by preemptively blacklisting the entire subdomain. Alternatively, the attacker may simply not bother to randomize the entire query name of each attack packet.

Collectively, these attacks are referred to as Distributed Denial-of-Service (DDoS) attacks because their purpose is to knock the target server offline, with the result that it cannot serve legitimate clients.

SUMMARY

In implementations, a computer-implemented method for creating a list of trustworthy DNS resolvers is disclosed. The method can comprise receiving, at a computer, a resolver profile for a resolver sending queries to a domain name server based any, or a combination, of a top-talker status of the resolver, a normalcy of distribution of domain names queried, a continuity of distribution of query type, a RD bit status, and information related to query traffic at one or more nodes in a distributed domain name server topology; applying a policy to the resolver profile to determine whether the resolver is trustworthy; and adding, by the computer, the resolver to a list of trustworthy resolvers if the resolver is determined to be trustworthy.

In implementations, the receiving can comprise receiving a resolver profile based on a continuity of an IP time-to-live variance of queries from the resolver.

In implementations, the method can comprise generating an indication of an attack condition if the resolver profile is not determined to be trustworthy.

In implementations, the method can comprise blocking queries from a resolver if the corresponding resolver profile is not determined to be trustworthy.

In implementations, the receiving can comprise receiving a profile for a resolver sending queries to a top-level domain name server.

In implementations, the resolver profile can comprise an array including one element for each profile feature and the elements can comprise binary values indicating that profile features are either normal or abnormal.

In implementations, the method can comprising applying a policy comprises applying a policy comprising one or more arrays including one element for each profile feature, the elements are binary values indicating either a normal or abnormal profile feature; and adding the resolver comprises adding the resolver to the list of trustworthy resolvers if its profile matches one of the preset policy arrays.

In implementations, a system for creating a list of trustworthy DNS resolvers is disclosed. The system can comprise a processing system comprising one or more processors; a communications port for receiving communications from networked devices and for transmitting communications to the networked devices; and a memory storing instructions that, when executed by the processing system, cause the system to perform the operations of: receiving, at a computer, a resolver profile for a resolver sending queries to a domain name server based on any, or a combination, of a top-talker status of the resolver, a normalcy of distribution of domain names queried, or a continuity of distribution of query type, a RD bit status, and information related to query traffic at one or more nodes in a distributed domain name server topology; applying a policy to the resolver profile to determine whether the resolver is trustworthy; and adding, by the computer, the resolver to a list of trustworthy resolvers if the resolver is determined to be trustworthy.

In implementations, the receiving can comprise receiving a resolver profile based on the continuity of the IP time-to-live variance of queries from the resolver.

In implementations, the operations can comprise generating an indication of an attack condition if the resolver profile is not determined to be trustworthy.

In implementations, the operations can comprise blocking queries from the resolver if the corresponding resolver profile is not determined to be trustworthy.

Implementations, the receiving can comprise receiving a profile for a resolver sending queries to a top-level domain name server.

In implementations, the resolver profile can comprise an array including one element for each profile feature; and the elements can comprise binary values indicating that profile features are either normal or abnormal.

In implementations, the applying a policy can comprise applying a policy comprising one or more arrays including one element for each profile feature, the elements are binary values that indicate either a normal or abnormal profile feature, and adding the resolver can comprise adding the resolver to the list of trustworthy resolvers if its profile matches one of the preset policy arrays.

In implementations, a computer-implemented method for creating a list of trustworthy DNS resolvers is disclosed. The method can comprise receiving, at a computer, a resolver profile for a resolver sending queries to a domain name server based any, or a combination, of a top-talker status of the resolver, a normalcy of distribution of domain names queried, a continuity of distribution of query type, a RD bit status, and information related to query traffic at one or more nodes in a distributed domain name server topology; applying a policy to the resolver profile to determine whether the resolver is trustworthy; and adding, by the computer, the resolver to a list of trustworthy resolvers if the resolver is determined to be trustworthy.

In implementations, the receiving can comprise receiving a resolver profile based on the continuity of the IP time-to-live variance of queries from the resolver.

In implementations, the method can comprise, generating an indication of an attack condition if the resolver profile is not deemed trustworthy.

In implementations, the method can comprise blocking queries from a resolver if the corresponding resolver profile is not determined to be trustworthy.

In implementations, the receiving can comprise receiving a profile for a resolver sending queries to a top-level domain name server.

In implementations, the resolver profile can comprise an array including one element for each profile feature; and the elements are binary values indicating that profile features are either normal or abnormal.

In implementations, the applying a policy can comprise applying a policy comprising one or more arrays including one element for each profile feature, the elements are binary values indicating either a normal or abnormal profile feature; and adding the resolver comprises adding the resolver to the list of trustworthy resolvers if its profile matches one of the preset policy arrays.

In implementations, a system for creating a list of trustworthy DNS resolvers is disclosed. The system can comprise a processing system comprising one or more processors; a communications port for receiving communications from networked devices and for transmitting communications to the networked devices; and a memory storing instructions that, when executed by the processing system, cause the system to perform the operations of: receiving, at a computer, a resolver profile for a resolver ending queries to a domain name server based on any, or a combination, of a top-talker status of the resolver, a normalcy of distribution of domain names queried, a continuity of distribution of query type, a RD bit status, and information related to query traffic at one or ore nodes in a distributed domain name server topology; applying a policy to the resolver profile to determine whether the resolver is trustworthy; and adding, by the computer, the resolver to a list of trustworthy resolvers if the resolver is determined to be trustworthy.

In implementations, the receiving can comprise receiving a resolver profile based on the continuity of the IP time-to-live variance of queries from the resolver.

In implementations, the operations can comprise generating an indication of an attack condition if the resolver profile is not determined to be trustworthy.

In implementations, the operations can comprise blocking queries from the resolver if the corresponding resolver profile is not determined to be trustworthy.

In implementations, the receiving can comprise receiving a profile for a resolver sending queries to a top-level domain name server.

In implementations, the resolver profile can comprise an array including one element for each profile feature; and the elements comprise binary values indicating that profile features are either normal or abnormal.

In implementations, applying a policy can comprise applying a policy comprising one or more arrays including one element for each profile feature, the elements are binary values that indicate either a normal or abnormal profile feature, and adding the resolver comprises adding the resolver to the list of trustworthy resolvers if its profile matches one of the preset policy arrays.

BRIEF DESCRIPTION OF THE DRAWING

The accompanying drawings, which are incorporated in and constitute a part of this specification, illustrate various embodiments and together with the description, serve to explain the principles of the embodiments. In the drawings.

FIG, 8 is a flowchart of a method for analyzing aggregate traffic to determine whether an attack is occurring.

Figure 9:
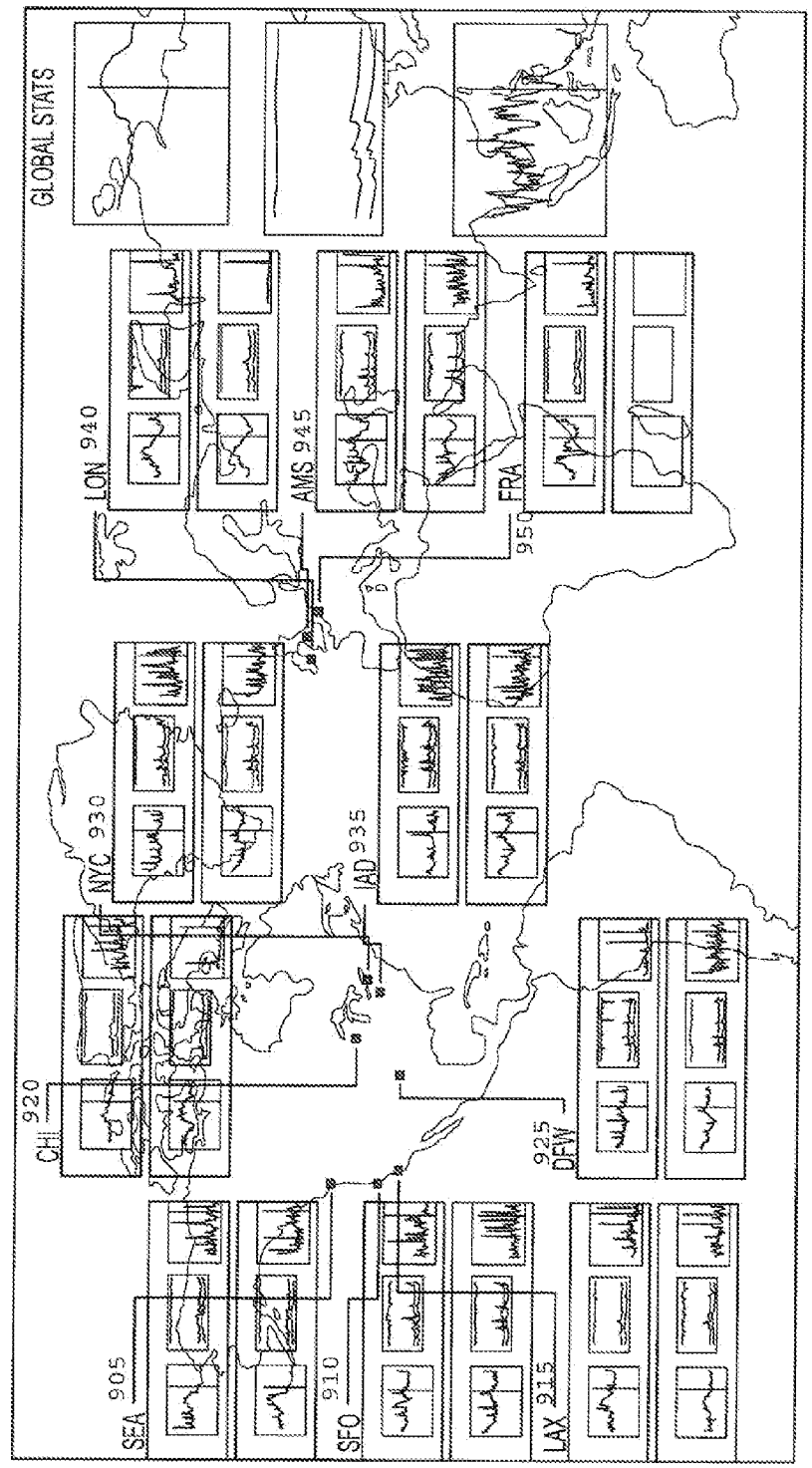

FIG. 9 shows an example geographical representation of monitors operable to track traffic in a plurality of node sites throughout the world according to aspects of the present teachings.

DETAILED DESCRIPTION

The following detailed description refers to the accompanying drawings. Wherever possible, the same reference numbers are used in the drawings and the following description to refer to the same or similar parts. While several exemplary embodiments and features are described herein, modifications, adaptations, and other implementations are possible, without departing from the spirit and scope of the invention. Accordingly, the following detailed description does not limit the invention. Instead, the proper scope of the invention is defined by the appended claims.

Figure 1:
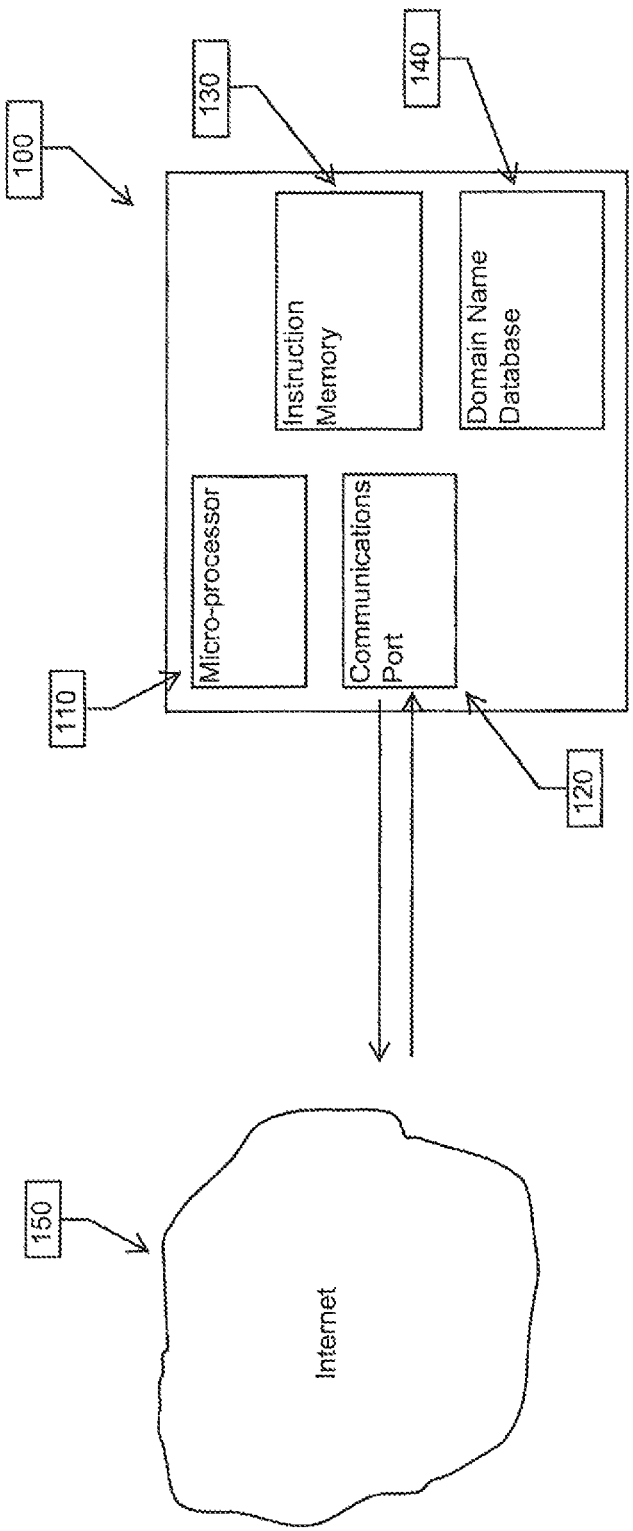
FIG. 1 is a diagram of a domain name server in a DNS system.

FIG. 1 is a diagram of a domain name server in the DNS. A DNS name server 100 comprises one or more processors 110, a communications port 120 for communicating with one or more networked devices via the internee 150, a computer memory 130 for storing instructions to cause the system to perform the operations described below, and a computer memory 140 for a database storing domain name and IP address information. In some embodiments the computer memory 130 containing instructions and the computer memory 140 containing domain name and IP address information may be combined into a single computer memory.

Figure 2:
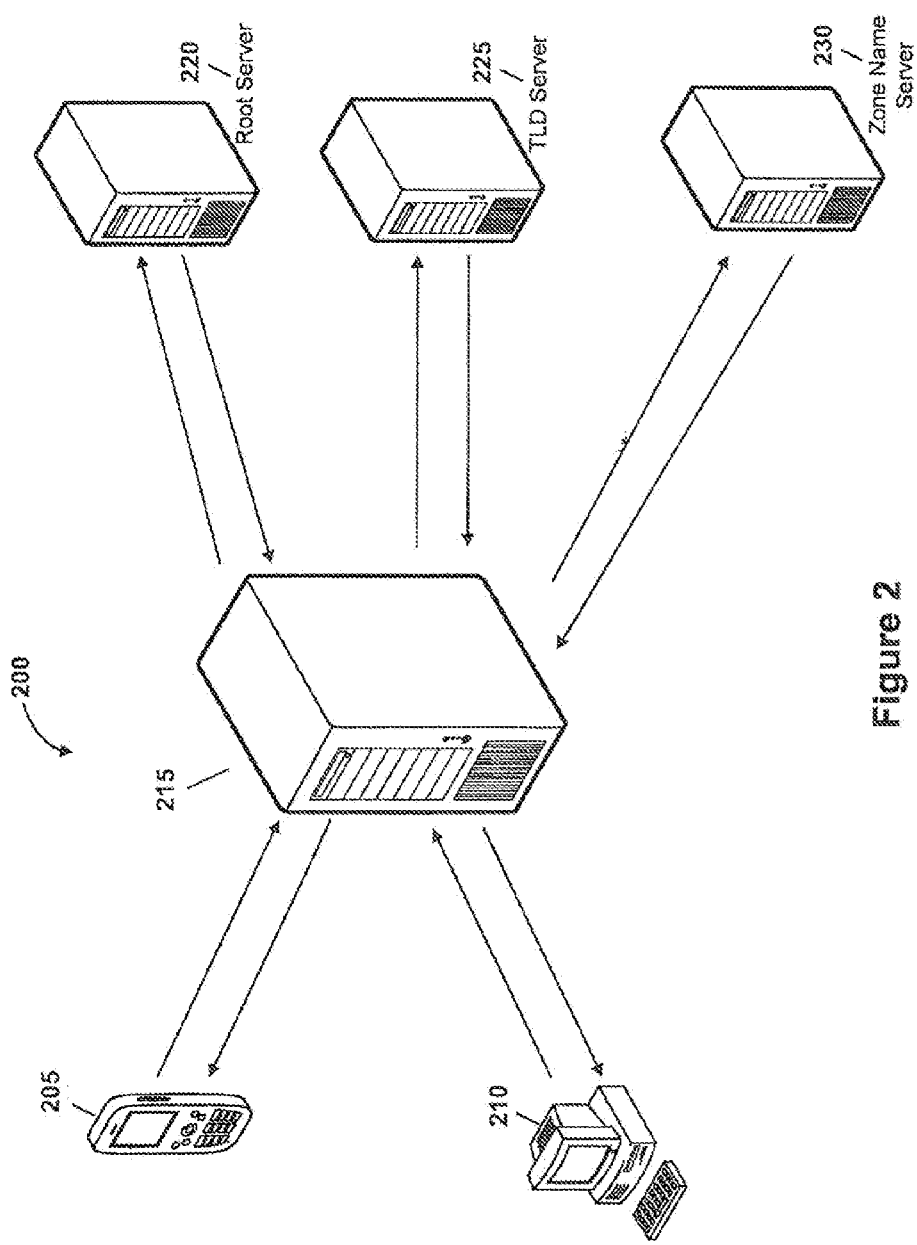
FIG. 2 is a diagram illustrating communications between end users, resolvers, and domain name servers in a DNS system.

FIG. 2 is a diagram illustrating communications between end users, resolvers, and domain name servers in a DNS system 200. End users such as a smart phone 205 or a desktop computer 210 communicate with the local resolver 215. The local resolver 215 matches domain names with IP addresses by communicating with a root server 220, a TLD name server 225, and a zone name server 230. Once the resolver 215 receives IP address information for a domain, it will store that information in its own servers temporarily. For that reason the local resolver 215 is sometimes referred to as a "caching" resolver.

When an end user 205 enters a domain name to view a website, the end user 205 transmits the domain name to the resolver 215. The resolver then queries the name servers successively starting with the root server 220, the TLD name server 225, the zone name server 230 and so on until the entire domain name is resolved.

Each query contains within it several features that can be used to build a profile of the resolver that sent it. The same features can also be used to build a profile of aggregate traffic over time. Those features, described in detail below, include the "top-talker" status of the resolver, the IP time-to-live (TTL) variance among queries from an individual resolver, the query type distribution, the query name distribution, a Recursion Desired (RD) bit status, and information related to query traffic based on the topology of the network(s). The disclosed embodiments may detect DDoS attacks by detecting changes in the query profiles of individual resolvers or aggregate traffic. The disclosed embodiments may also mitigate attacks by blocking or ignoring presumed-malicious queries at the domain name server.

Top-talker status. Top-talkers are the most active resolvers. In one embodiment, top-talkers are defined as the largest resolvers that in aggregate make up 90% of query traffic. Generally the top-talkers list consists of a relatively small number of resolvers. For example, if millions of resolvers query a TLD over a period of time, a mere 40,000 of those may be responsible for 90% of the total traffic. The list of top-talkers is dynamic, however, with new resolvers replacing existing ones as their respective query volume to a particular TLD name server changes. In one embodiment, the top-talker list is updated on rolling basis. In another embodiment, the top-talker list can be updated at various intervals.

IP TTL Variance. IP TTL is a counter in an IP packet that decrements every time the packet passes through a router. When the counter reaches zero, the packet is discarded. This mechanism prevents IP packets from endlessly circulating in an Internet system. The TTL variance is thus serves as a relative measure of the distance, counted in router relays, an IP packet has traveled.

Given static network conditions and a fixed source and destination, the IP TTL of packets observed at the destination should vary little, if at all, since they would presumably travel the same route. While the use of UDP for DNS queries makes it trivial for attackers to spoof an address, the TTL from a spoofed address may not match the TTL in an IP packer from the real address. Therefore, while important legitimate DNS caching resolvers exhibit very little TTL variance, attacks involving spoofing tend to create high variance.

The TTL variance of packets from a single source at any given time is not a definitive indication that an attacker is spoofing that source address. Rather, an increase in variance is an indicator of an IP-level change related to a source. One explanation for an increase in IP TTL variance is an attacker spoofing an address that s currently active or that was previously profiled. In this case, when the spoofed IP packets arrive at the DNS name server, the paths travelled by spoofed packets will be different from the path travelled by packets from the authentic source. Moreover, if there are multiple sources sending queries with spoofed addresses, their respective packets will travel different paths also, contributing to even more TTL variance.

Figure 3:
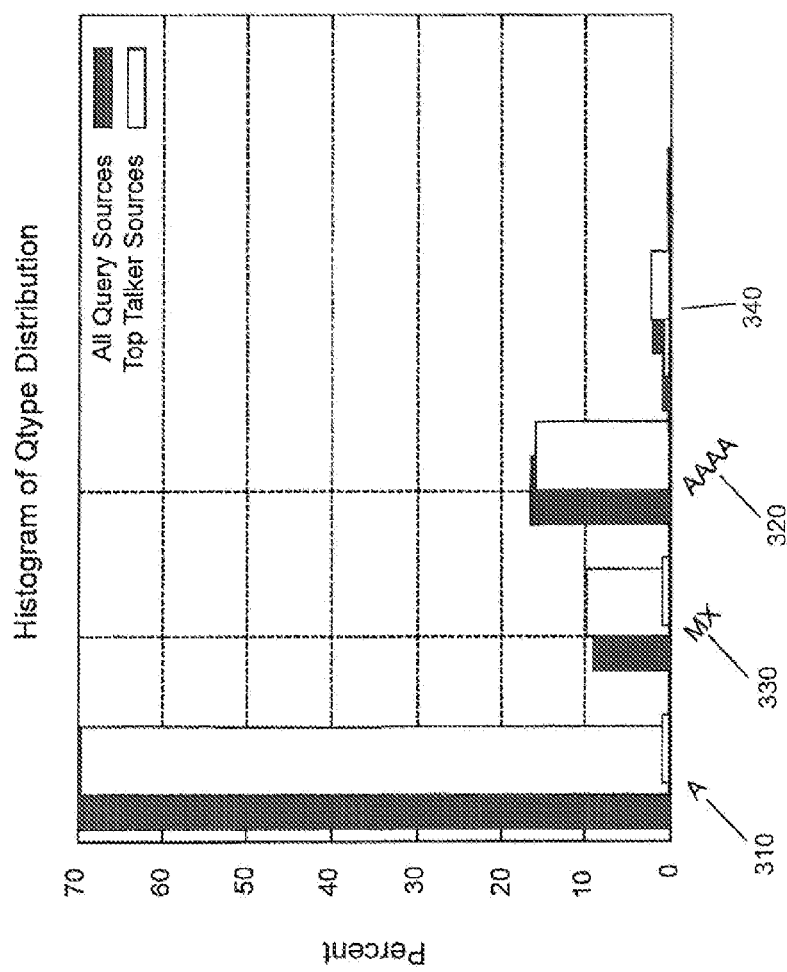
FIG. 3 is a histogram of query type distribution for all sources and for top-talkers.

Query type Profiling. Resolvers send several different types of queries to a DNS server. FIG. 3 shows a typical distribution of query types over a non-attack period. The figure shows that queries for IPv4 addresses (type A) 310 clearly dominate. IPv6 addresses (type AAAA) 320 are the second most popular type requested, and are requested more frequently than mail server (type MX) 330 records. Other legitimate query types 340 are observed, including DNSSEC record types, service location record types, and even obsolete A6 records, but they constitute only a small portion of the query traffic. In implementations, other query or transaction types can be monitored, including, but not limited to, transactions related to web traffic, DNS traffic, database traffic, and traffic related to digital phone calls.

FIG. 3 also shows that the query type distribution for top-talkers is roughly the same as for all traffic. This allows a TLD name server 225 to quantify normal behavior using a relatively small number of resolvers.

Figure 4:
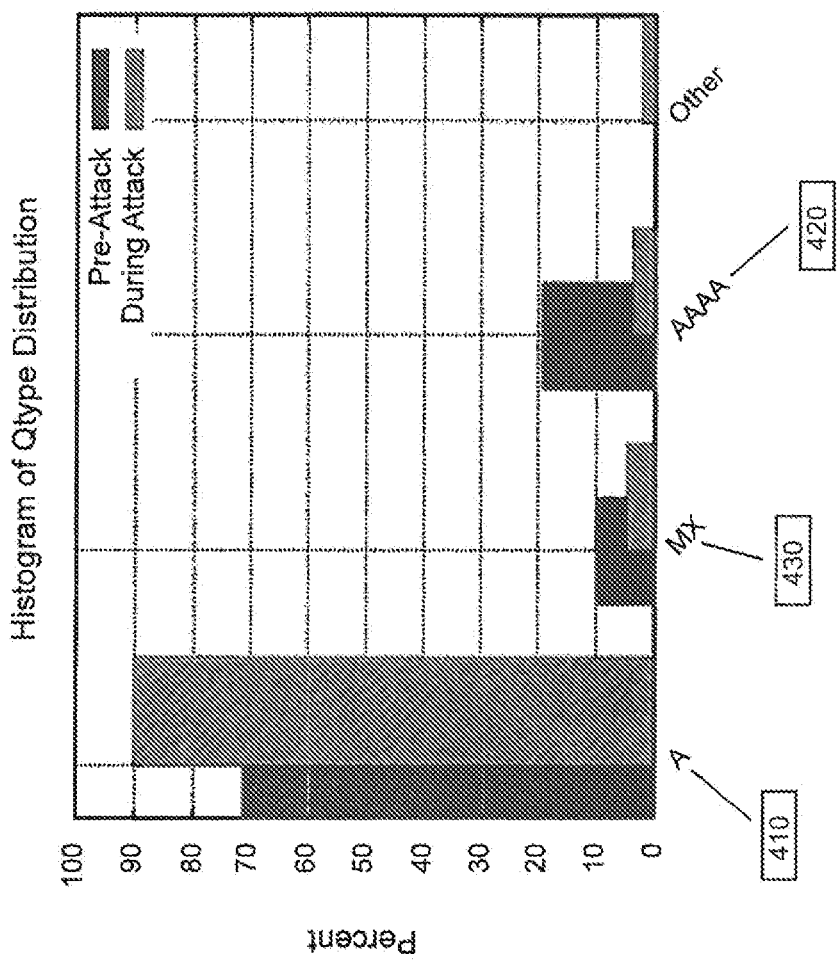
FIG. 4 is a histogram comparing query type distribution between normal traffic and an attack event.

An attack event may skew the query type distribution with an overabundance of one type of query. FIG. 4 compares normal traffic query type distribution to traffic during an attack event. Notice that the resolver typically sends 70% type A queries 410, 20% type AMA queries 420, and 10% type MX queries 430. During the attack this changes to 90% type A queries 410, 5% type AAAA queries 420, and 4% type MX queries 430.

In one embodiment, a deviation from previous query type distribution qualifies as "significant" if any of the three most popular query types changes its proportion of the overall query traffic by at least a constant factor. For example, a change from 70% to 90% type A queries may not be considered significant, but the proportion of type AAAA queries will have a corresponding drop significant enough to trigger this feature. In one embodiment this query type anomaly detection can be applied to queries from a single source. In another embodiment this query type anomaly detection can be applied to aggregate query traffic.

Query name Profiling. Unlike a profile of query types, a query name profile must deal with a vast number of potential names. There are only a few hundred potential query types and the data showed that only three of them contribute a substantial percentage of queries. In contrast, there are tens of millions of potential query names. Some legitimate busy sources can issue queries for millions of names over just a couple of days. Further, some malicious sources can issue this many queries in less than a minute.

Recursion Desired (RD) bit status. The RD bit may be set in a query and is copied into the response. If the RD bit is set, the name server is directed to pursue the query recursively. Recursive query support is optional and is typically set to 0 if recursion is not desired and set to 1 if recursion is desired. In implementations, a determination can be made as to whether or not the RD bit is set, and in response to this determination, action can be taken as to whether the query sent by the requestor is a normal, valid, and/or legitimate query. For example, historical data or trends in historical data can be used to provide a temporal baseline of normal actively relating to the RD bit status for particular requestors. If unusual and/or unexpected queries are received that has anomalous properties relating to the RD bit status, action can be taken, such as removing or not including the requestor in the white list. In implementations, RD bit status can be monitored for all traffic from all requestors or for selected traffic from selected requestors, such as those having top-talker status.

Information related to query traffic based on the network topology. The information related to query traffic across the topology of the various requesters and providers can be used to determine, in part, where particular entities are involved, either directly or indirectly, with DDoS attacks. In implementations, information collected by nodes with a network environment can be measured, aggregated, and compared to determine trends over time, for example, day-to-day or week-to-week. For example, a particular node within the network may receive queries from a particular requester on a periodic basis. If unexpectedly, the particular node and/or another node, for example a neighboring node, receives unexpected concurrent or simultaneous, or substantially simultaneous requests from the particular requestor, then the change in destination of the request can be used, in part, to label the particular requester as a potentially anomalous or malicious requester. Action can then be taken, such as removing or not including the requestor in the white list. In implementations, information related to query traffic based on network topology can be monitored for all traffic from all requesters or for selected traffic from selected requesters, such as those having top-talker status.

Figure 5:
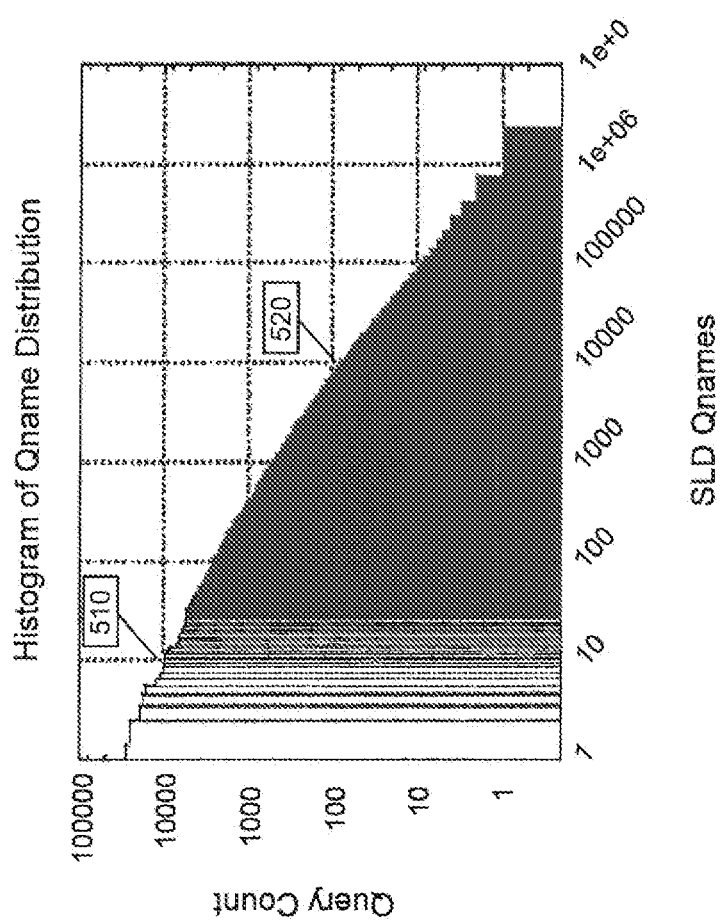
FIG. 5 is a histogram of query name distribution for all sources over a ten-minute period of normal traffic.

FIG. 5 shows the relative popularity of SLD names seen across all sources for just a 10 minute period. FIG. 5 shows that fewer than ten SLDs were queried over 10,000 times (point 510). Fewer than 10,000 SLDs were queried more than 100 times (point 520). The sheer size of the query name space represents a spatial complexity that may be difficult to profile for very long periods of time. This is because large resolvers may easily send tens of thousands of SLD requests in just minutes. Thus, the query name measurement period is capped to a relatively short duration. Such a short period does not lend itself well to profiling the distribution of SLDs that a resolver tends to query; however, it does allow us to observe when a top-talker (or any busy resolver) is sending a disproportionate number of queries to a specific SLD. Normally, a resolver should send a very small number of concurrent queries for a particular SLD before caching its IP address and sending further queries to the resolvers own servers. Therefore, a spike in the frequency of one or more SLDs may indicate an attack.

Figure 6:
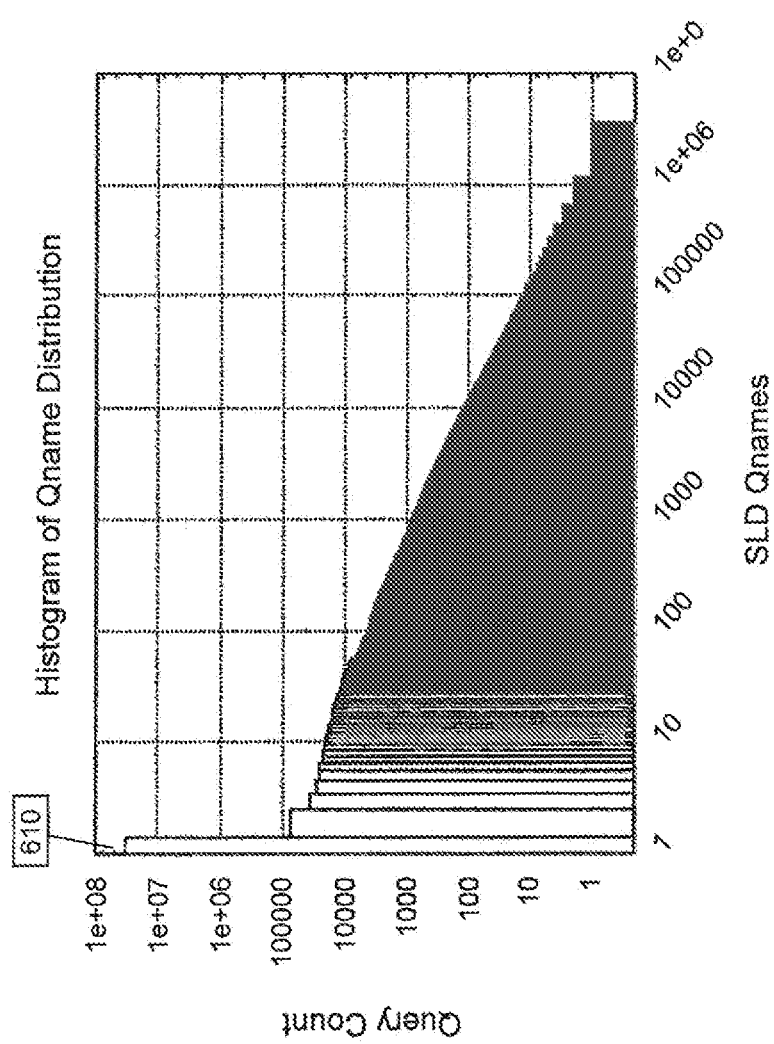
FIG. 6 is a histogram of query name distribution during an attack.

FIG. 6 shows domain name distribution during an attack event. If an attacker is launching a zone-targeted attack, then the SLD ([SLD].com) will be common to all attack queries. Alternatively, an attacker may simply not bother to randomize the SLD queried. In either case, the query name distribution will reveal a spike in the query name 610.

Figure 7:
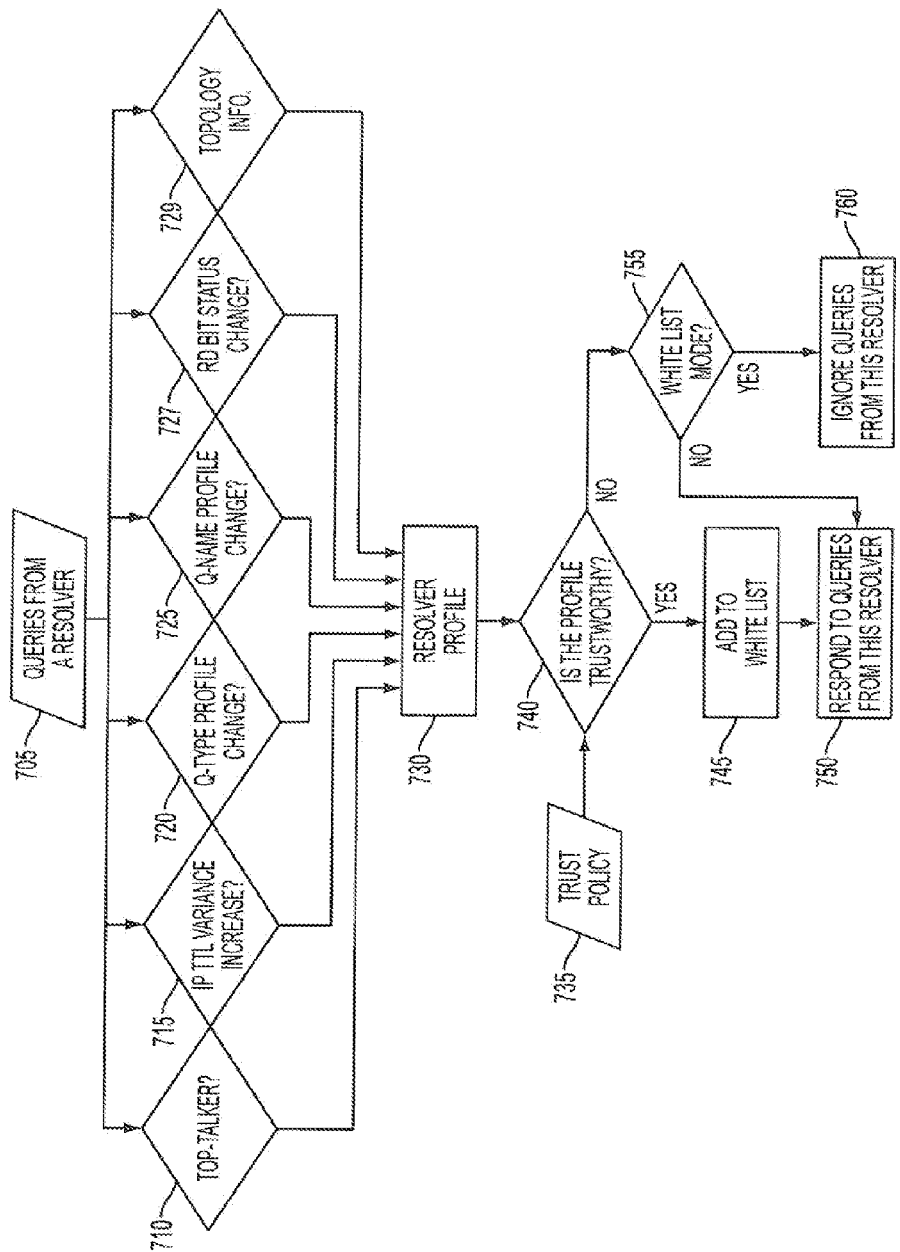
FIG. 7 is a flowchart of a method for analyzing query features, building a resolver profile, and creating a "white list" of trusted resolvers.

Creating a white list. FIG. 7 is a flowchart showing a method for generating a white list of trusted resolvers according to one embodiment of the invention. Queries from a resolver 705 are analyzed to determine the status of several features. Those features can include one or more of the following: whether or not the resolver is a top-talker 710, whether the IP TTL variance of queries from the resolver has suddenly increased 715, whether the query type profile has undergone a substantial change 720, whether the query name profile shows a sudden surge in the frequency of a particular SLD 725, RD bit status 727, and information related to query traffic based on topology 729. The status of one or more of these features are used to build a resolver profile 730. In one embodiment, the resolver profile 730 consists of a binary 6-tuple in the form <top-talker, IP TTL, q-type, q-name, RD bit status, query traffic based on topology information>. A "1" in the first position indicates a non top-talker. A "1" in any of the other positions indicates that the feature is anomalous. For example, a profile of <0, 1, 0, 0, 0, 0> is a top-talker exhibiting an increase in TTL variance.

The resolver profile 730 is next compared to a trust policy 735. A trust policy 735 consists of the different resolver profiles the TLD would deem trustworthy, and thus assign to a white list. For example, a trust policy may look like: [<0, 0, 0, 0, 0, 0> <1, 0, 0, 0, 0, 0> <0, 1, 0, 0, 0, 0>]. This policy would assign both top-talker and non top-talker resolvers to a white list as long as all other behavior is normal. This policy would also assign top-talker resolvers to a white list even if they develop an IP TTL variance. A policy need not be static, and in fact can be altered at any time as conditions change. In one embodiment, detecting one or more resolvers with profiles not deemed trustworthy indicates that an attack event is occurring.

A TLD name server may continue responding to all queries even if some resolvers have profiles that are not deemed trustworthy and thus are not assigned to a white list. Similarly, a name server may continue responding to all queries even after determining that an attack is under way. If the attack is severe enough, however, the name server may choose to move to a white list mode 755. In a white list mode, the name server will respond only to queries from resolvers on the white list 750 while ignoring queries from resolvers not on the white list 760.

Figure 8:
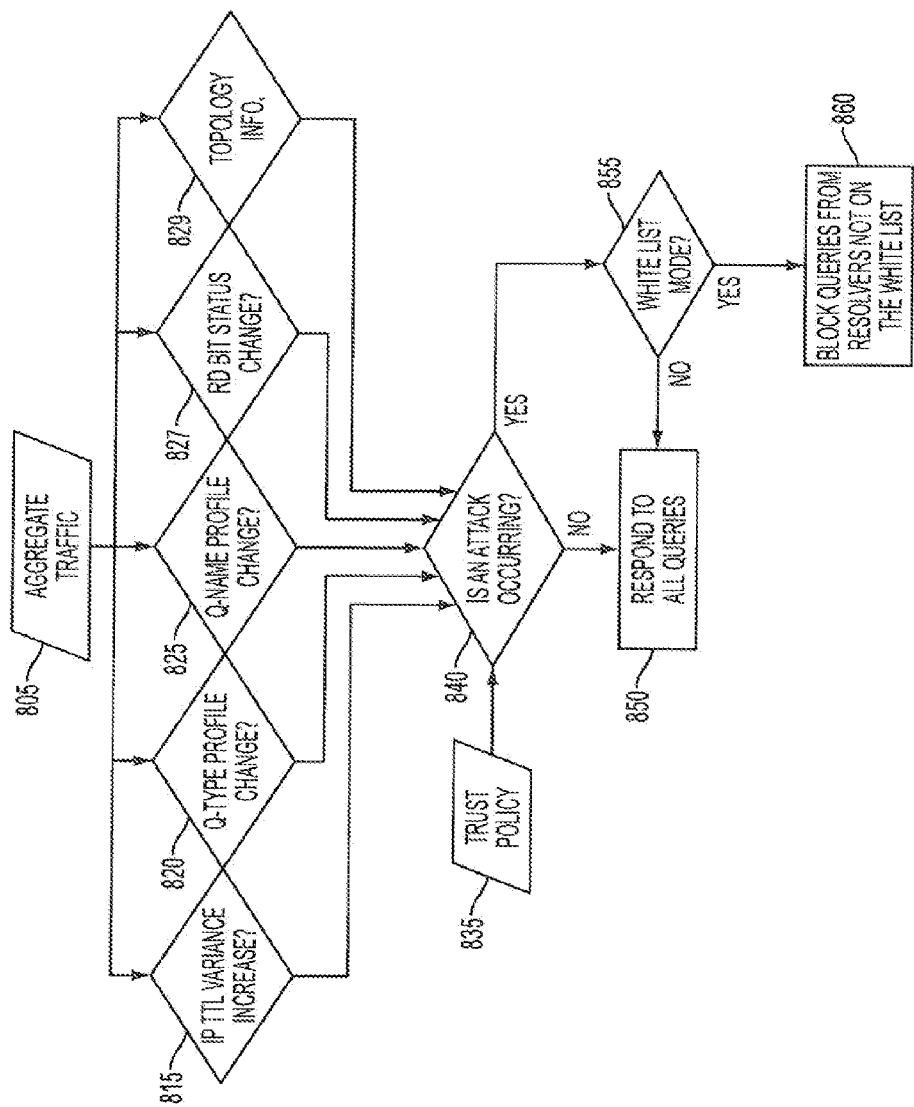

Detecting an attack, FIG. 8 is a flowchart for a method of detecting DDoS attacks at the name server according to another embodiment. In this embodiment, the DNS name server monitors the query features of aggregate traffic and detects changes in query features such as per-source IP TTL variance 815, query type distribution 820, query name distribution 825, RD bit status 827, query traffic based on topology information 829. In one embodiment, detecting anomalous behavior in one or more query features of the aggregate traffic indicates that an attack is occurring 840. The TLD name server may continue responding to all queries 850 even if the name server determines that an attack is occurring 840. If the attack is severe enough, however, the name server may choose to move to a white list mode 855. In a white list mode, the name server will respond only to queries from resolvers on the white list while ignoring queries from resolvers not on the white list 860.

FIG. 9 shows an example geographical representation of monitors operable to track traffic in a plurality of nodes sites throughout the world. In implementations, monitors, for example monitors 905, 910, 915, 920, 925, 930, 935, 940, 945, and 950 are operable to watch or monitor traffic from requestors, for example, but not limited to, DNS query sources, that are communicating with one or more nodes, build profiles on the requestors, and track and analyze statistics about the sources it sees or monitors. The number of monitors shown in FIG. 9 is merely an example arrangement. Additional or fewer numbers of monitors could also be used. By the distributed deployment or topology of the monitors throughout one or more geographical regions, each individual monitor can be responsible for monitoring and providing query traffic data that can be used to identify anomalous or suspicious behavior of requestors. For example, profiles can be built on a per-source or per-site basis and can include attributes, including those discussed above, such as, for example, one or more of the following: top-talker status, IP TTL variance of queries from the resolver, query type, query name, RD bit status, information related to query traffic base on topology, etc. In some implementations, only those attributes from the top-talkers are tracked to reduce the processing time or cycles, energy consumption, and storage burden of the monitors.

From the per-source statistics, the monitors can provide an aggregate view for each of the sites, and then further aggregate each site into a global view. As a result, trends across the topology and across multiple sites can be determined and, in some embodiments, corrective action can be initiated. Moreover, because of the distributed nature of the monitors throughout one or more geographic regions and the ability to aggregate data from the plurality of monitors, suspicious or potentially suspicious behavior at one or more individual nodes can be identified. For example if anomalous or potentially suspicious traffic begins to appear at monitors 930 and 935, but not at the other locations, traffic from requestors around the eastern United States may warrant more scrutiny than other traffic.

Further, since current data trends can be compared with historic data trends, traffic can be normalized to a pre-attack state without severely affecting legitimate traffic as opposed to a more aggressive approach of dropping all traffic. For example the pre-attack state of a requestor can include a dynamically derived fingerprint or identifier of the behavior and/or traffic of the requestor over a predefined time period, including, but not limited to, network activity over a particular time interval, network activity between one or more nodes within the network, etc. Additionally or alternatively, traffic can be rate-limited based on one or more particular sites and/or requestors by using this overall topology-based approach, including the pre-attack state or fingerprint of the requestors, allowing a more controlled and efficient response. For example, the rate limiting can use the pre-attack state or fingerprint based on the data and/or attributes contained within the 6-tuple, as discussed above. In some implementations, machine learning approaches can be used to provide improved results by using historic and/or topological data to detect potential attacks at an earlier time when damage can be minimized.

The foregoing description, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, although four profile features are discussed, workable embodiments may employ either fewer features or additional features to generate a white list. The steps described need not be performed in the same sequence discussed or with the same degree of separation. Likewise various steps may be omitted, repeated, or combined, as necessary, to achieve the same or similar objectives. Accordingly, the invention is not led to the above-described embodiments, but instead is defined by the appended claims in light of their full scope of equivalents.

What is claimed is:

1. A computer-implemented method for creating a list of trustworthy DNS resolvers, the method comprising:
    receiving, at a computer, a resolver profile for a resolver sending queries to a domain name server based any, or a combination, of a top-talker status of the resolver, a normalcy of distribution of domain names queried, a continuity of distribution of query type, a RD (Recursion Desired) bit status, and information related to query traffic at one or more nodes in a distributed domain name server topology;
    applying a policy to the resolver profile to determine whether the resolver is trustworthy; and
    adding, by the computer, the resolver to a list of trustworthy resolvers if the resolver is determined to be trustworthy.

2. The computer-implemented method of claim 1 wherein receiving comprises receiving a resolver profile based on a continuity of an IP time-to-live variance of queries from the resolver.

3. The computer-implemented method of claim 1 comprising generating an indication of an attack condition if the resolver profile is not determined to be trustworthy.

4. The computer-implemented method of claim 1 comprising blocking queries from a resolver if the corresponding resolver profile is not determined to be trustworthy.

5. The computer-implemented method of claim 1 wherein receiving comprises receiving a profile for a resolver sending queries to a top-level domain name server.

6. The computer-implemented method of claim 1 wherein:
    the resolver profile comprises an array including one element or each profile feature; and
    the elements comprise binary values indicating that profile features are either normal or abnormal.

7. The computer-implemented method of claim 1 wherein:
    applying a policy comprises applying a policy comprising one or more arrays including one element for each profile feature,
    the elements are binary values indicating either a normal or abnormal profile feature; and adding the resolver comprises adding the resolver to the list of trustworthy resolvers if its profile matches one of the preset policy arrays.

8. A system for creating a list of trustworthy DNS resolvers comprising:
   a processing system comprising one or more processors;
   a communications port for receiving communications from networked devices and for transmitting communications to the networked devices; and
   a memory storing instructions that, when executed by the processing system, cause the system to perform the operations of:
   receiving, at a computer, a resolver profile [or a resolver sending queries to a domain name sewer based on any, or a combination, of a top-talker status of the resolver, a normalcy of distribution of domain names queried, or a continuity of distribution of query type, a RD (Recursion Desired) bit status, and information related to query traffic at one or more nodes in a distributed domain name server topology;
   applying a policy to the resolver profile to determine whether the resolver is trustworthy; and adding, by the computer, the resolver to a list of trustworthy resolvers if the resolver is determined to be trustworthy.

9. The system of claim 8 wherein receiving comprises receiving a resolver profile based on the continuity of the IP time-to-live variance of queries from the resolver.

10. The system of claim 8, the operations comprising generating an indication of an attack condition if the resolver profile is not determined to be trustworthy.

11. The system of claim 8, the operations comprising blocking queries from the resolver if the corresponding resolver profile is not determined to be trustworthy.

12. The system of claim 8 wherein receiving comprises receiving a profile for a resolver sending queries to a top-level domain name server.

13. The system of claim 8 wherein:
   the resolver profile comprises an array including one element for each profile feature; and
   the elements comprise binary values indicating that profile features are either normal or abnormal.

14. The system of claim 8 wherein:
   applying a policy comprises applying a policy comprising one or more arrays including one element for each profile feature,
   the elements are binary values that indicate either a normal or abnormal profile feature, and
   adding the resolver comprises adding the resolver to the list of trustworthy resolvers if its profile matches one of the preset policy arrays.

15. A computer-implemented method for creating a list of trustworthy DNS resolvers, the method comprising:
   receiving, at a computer, a resolver profile for a resolver sending queries to a domain name server based any, or a combination, of a top-talker status of the resolver, a normalcy of distribution of domain names queried, a continuity of distribution of query type, a RD (Recursion Desired) bit status, and information related to query traffic at one or more nodes in a distributed domain name server topology;
   applying a policy to the resolver profile to determine whether the resolvers trustworthy; and
   adding, by the computer, the resolver to a list of trustworthy resolvers if the resolver is determined to be trustworthy.

16. The computer-implemented method of claim 15 wherein receiving comprises receiving a resolver profile based on the continuity of the IP time-to-live variance of queries from the resolver.

17. The computer-implemented method of claim 15 comprising generating an indication of an attack condition if the resolver profile is not deemed trustworthy.

18. The computer-implemented method of claim 15 comprising blocking queries from a resolver if the corresponding resolver profile is not determined to be trustworthy.

19. The computer-implemented method of claim 15 wherein receiving comprises receiving a profile for a resolver sending queries to a top-level domain name server.

20. The computer-implemented method of claim 15 wherein:
   the resolver profile comprises an array including one element for each profile feature; and
   the elements are binary values indicating that profile features are either normal or abnormal.

21. The computer-implemented method of claim 15 wherein:
   applying a policy comprises applying a policy comprising one or more arrays including one element for each profile feature,
   the elements are binary values indicating either a normal or abnormal profile feature; and
   adding the resolver comprises adding the resolver to the list of trustworthy resolvers if its profile matches one of the preset policy arrays.

22. A system for creating a list of trustworthy DNS resolvers comprising:
   a processing system comprising one or more processors;
   a communications port for receiving communications from networked devices and for transmitting communications to the networked devices; and
   a memory storing instructions that, when executed by the processing system, cause the system to perform the operations of:
   receiving, at a computer, a resolver profile for a resolver sending queries to a domain name server based on any, or a combination, of a top-talker status of the resolver, a normalcy of distribution of domain names queried, a continuity of distribution of query type, a RD (Recursion Desired) bit status, and information related to query traffic at one or more nodes in a distributed domain name server topology;
   applying a policy to the resolver profile to determine whether the resolver is trustworthy; and
   adding, by the computer: the resolver to a list of trustworthy resolvers if the resolver is determined to be trustworthy.

23. The system of claim 22 wherein receiving comprises receiving a resolver profile based on the continuity of the IP time-to-live variance of queries from the resolver.

24. The system of claim 22, the operations comprising generating an indication of an attack condition if the resolver profile is not determined to be trustworthy.

25. The system of claim 22, the operations comprising blocking queries from the resolver if the corresponding resolver profile is not determined to be trustworthy.

26. The system of claim 22 wherein receiving comprises receiving a profile for a resolver sending queries to a top-level domain name server.

27. The system of claim 22 wherein:
   the resolver profile comprises an array including one element for each profile feature; and the elements comprise binary values indicating that profile features are either normal or abnormal.

28. The system of claim 22 wherein:
applying a policy comprises applying a policy comprising one or more arrays including one element for each profile feature,
the elements are binary values that indicate either a normal or abnormal profile feature, and
adding the resolver comprises adding the resolver to the list of trustworthy resolvers if its profile matches one of the preset policy arrays.

* * * * *